United States Patent
Iwanari et al.

(10) Patent No.: US 9,010,014 B2
(45) Date of Patent: Apr. 21, 2015

(54) ROD BODY FOR FISHING ROD AND FISHING ROD

(75) Inventors: Tomoki Iwanari, Sakai (JP); Soushi Iwata, Sakai (JP); Kazuma Taniguchi, Izumiohtsu (JP)

(73) Assignee: Shimano Inc., Sakai, Osaka (JP)

( * ) Notice: Subject to any disclaimer, the term of this patent is extended or adjusted under 35 U.S.C. 154(b) by 683 days.

(21) Appl. No.: 13/380,499

(22) PCT Filed: Sep. 17, 2009

(86) PCT No.: PCT/JP2009/066309
§ 371 (c)(1),
(2), (4) Date: Mar. 12, 2012

(87) PCT Pub. No.: WO2010/150421
PCT Pub. Date: Dec. 29, 2010

(65) Prior Publication Data
US 2012/0174467 A1 Jul. 12, 2012

(30) Foreign Application Priority Data

Jun. 23, 2009 (JP) ................................. 2009-148838
Jul. 8, 2009 (JP) ................................. 2009-161953

(51) Int. Cl.
*A01K 87/00* (2006.01)
(52) U.S. Cl.
CPC ...................................... *A01K 87/00* (2013.01)
(58) Field of Classification Search
CPC ................. A01K 87/00; A63B 53/10
See application file for complete search history.

(56) References Cited

U.S. PATENT DOCUMENTS

| 4,133,708 | A  | * | 1/1979  | Tokuno          | 156/179  |
| 6,513,277 | B1 | * | 2/2003  | Morimoto et al. | 43/18.1 R |
| 2005/0223617 | A1 | * | 10/2005 | Morita et al.   | 43/18.5  |
| 2006/0251877 | A1 | * | 11/2006 | Pirazzini       | 428/292.1 |

FOREIGN PATENT DOCUMENTS

| JP | 50-68886 A | 6/1975 |
| JP | 02-009621 A | 1/1990 |

(Continued)

OTHER PUBLICATIONS

International Search Report issued Dec. 28, 2009, in related PCT Application No. PCT/JP2009/066309.

*Primary Examiner* — Darren W Ark
*Assistant Examiner* — Danielle Clerkley
(74) *Attorney, Agent, or Firm* — Jeffer Mangels Butler & Mitchell LLP; Brennan C. Swain, Esq.

(57) ABSTRACT

A rod body for a fishing rod, in which torsional rigidity and the like are enhanced by exercising ingenuity in direction of arrangement of a prepreg tape, is provided. An inner layer 23 is formed by winding a main pattern, which is constituted by a prepreg sheet 52 having a length corresponding to the length of a rod body and provided with reinforcing fibers 42 uniformly aligned, so that reinforcing fibers 42 are tilted relative to the rod axis. An outer layer 25 is formed by helically winding a prepreg tape with small-width 70, which is constituted by reinforcing fibers 42 uniformly aligned in the longitudinal direction, in the rod axis direction so that ends of the prepreg tape 70 in the small-width direction thereof abut closely against each other. The reinforcing fibers 42 of the prepreg sheet 52 and the reinforcing fibers 42 of the prepreg tape 70 are wound so as to cross each other when viewed in a radial direction, with the winding being made helically in directions opposite to each other.

6 Claims, 8 Drawing Sheets

(56) References Cited

FOREIGN PATENT DOCUMENTS

| | | |
|---|---|---|
| JP | 2000-217472 A | 8/2000 |
| JP | 2001-009924 A | 1/2001 |
| JP | 2001-190185 A | 7/2001 |
| JP | 2006-246810 A | 9/2006 |
| JP | 2006-320235 A | 11/2006 |

* cited by examiner

ROD BODY FOR FISHING ROD AND FISHING ROD

FIELD OF THE INVENTION

The present invention relates to a rod body for a fishing rod having an inner layer formed by winding a prepreg and an outer layer formed by winding a prepreg, and to a fishing rod having the rod body for a fishing rod.

BACKGROUND OF THE INVENTION

In a rod body for a fishing rod of this type, a prepreg molded into a tape or a prepreg molded into a sheet is sometimes used. A prepreg tape has an elongated shape with small-width and comprises reinforcing fibers oriented in the longitudinal direction of the prepreg tape.

A prepreg sheet has a length corresponding to the length of a rod body for a fishing rod and a width necessary for forming a tubular body so as to take an approximately trapezoidal shape.

An inner layer or an outer layer is formed using such a prepreg tape by helically winding the prepreg tape around a mandrel in the rod axis direction in an overlapping state.

While the prepreg tape is used for both the inner layer and the outer layer, directions in which the prepreg tape is helically wound are the same in both layers. Specifically, as shown in FIGS. 3 and 5 of the Patent Document 1, the winding direction of the prepreg tape is set to the same right-handed direction for both inner and outer layers.

Consequently, since the reinforcing fibers of the prepreg become oriented in the direction identical with the direction of the prepreg tape, the reinforcing fibers of the prepreg and the prepreg tape end up being arranged in the same direction. While the reinforcing fibers provide a tensile matching force to ensure sufficient torsional rigidity when subjected to a torsional force in the right-handed direction, the reinforcing fibers are unable to provide a matching tensile force when subjected to a torsional force in a left-handed direction and causes a reduction in torsional rigidity.

Patent Document 1: Japanese Patent Application Laid-open No. 2008-263819

Besides configurations such as that described above, there is also a configuration in which prepreg tapes are arranged on the inside and the outside so as to sandwich a prepreg sheet as the intermediate layer.

Patent Document 2: Japanese Utility Model Publication No. S63-32631

In the invention described in Patent Document 2, an intermediate layer is formed by winding a prepreg sheet having a length corresponding to the total length of a rod body for a fishing rod, and the inner layer positioned on the inside of the intermediate layer is formed by helically winding a prepreg tape with small-width in a rod axis direction at a wider pitch than the width of the prepreg tape. On the other hand, the outer layer positioned on the outside of the intermediate layer is formed by helically winding a prepreg tape with small-width in a rod axis direction at a wider pitch than the width of the prepreg tape. In addition, the winding direction of the prepreg tape forming the outer layer is set opposite to a winding direction of the prepreg tape forming the inner layer.

However, even with a configuration in which winding directions of prepreg tapes positioned on the inside and the outside are set opposite to each other as described above, since the prepreg tapes are simply wound at a wide pitch, the inner layer and the outer layer merely reinforce the intermediate layer and do not provide sufficient torsional rigidity.

SUMMARY OF THE INVENTION

An object of the present invention is to provide a rod body for a fishing rod in which torsional rigidity and the like are enhanced by applying improvement in directional arrangement of reinforcing fibers in a prepreg tape.

With the characteristic configuration according to a first invention since a prepreg sheet of the inner layer and a prepreg tape of the outer layer are wound so that reinforcing fibers of the prepreg sheet and reinforcing fibers of the prepreg tape cross each other when viewed in a radial direction, with the winding being formed helically in directions opposite to each other, even if a torsional force is applied from either left-handed or right-handed direction, some of the reinforcing fibers can match the torsional force. As a result, a rod body for a fishing rod which has high torsional rigidity and which is independent of a torsional direction can be obtained.

In addition, since the prepreg tape is helically wound in the rod axis direction in a state where ends in a small-width direction of the prepreg tape abut closely each other, besides simply reinforcing the prepreg sheet of the inner layer, the prepreg tape also becomes an element that constitutes the outer layer of the rod body for a fishing rod and enhances torsional strength.

Therefore, when an angler holds a fishing rod sideways to respond to a movement of a fish which has struck and which runs sideways, an operation for bringing the fish to the water surface while following the movement of the fish with the fishing rod can be easily performed.

Furthermore, since a prepreg sheet is wound as the inner layer, the following advantage may be gained in comparison to a case where a prepreg tape is wound as the inner layer. That is, when the prepreg tape is wound, since winding must be performed in a state in which adjacent ends in the small-width direction abut closely each other, there is a difficulty in terms of workability. In comparison, with a prepreg sheet, there is no need to be mindful that winding be performed in a state in which adjacent ends in the small-width direction abut closely each other and a high-strength inner layer can be formed.

Moreover, reinforcing fibers of the prepreg sheet are wound in a state where the reinforcing fibers are tilted relative to the rod axis direction. Accordingly, the following statement can be made. When a fish has struck and a fishing rod bends downward, a significant tensile force acts on a surface on the upper side of the rod axis of each rod body for a fishing rod. In this case, a matching force provided by a component in the rod axis direction of the reinforcing fibers of the prepreg sheet enables a tensile force by the fish to be matched. On the other hand, when a fish has struck and a rod bends downward, a force acts which causes a cross section of each rod body for a fishing rod to be deformed into a horizontally long ellipsoid. In this case, a component in the circumferential direction of the reinforcing fibers of the prepreg sheet provides a matching force and enables the deformation force to be matched.

As described above, by uniformly aligning the reinforcing fibers of the prepreg sheet in a direction that is tilted relative to the rod axis, a prepreg sheet with high bending rigidity, which has a function corresponding to a state in which reinforcing fibers are arranged along the rod axis so that they provide matching force against a tensile force in the rod axis direction as well as a function corresponding to a state in which reinforcing fibers having high strength against a force that causes a cross section to be deformed into a horizontally long ellipsoid are arranged in the circumferential direction, can be achieved by a single prepreg sheet.

Since a prepreg sheet is arranged on the inside and a prepreg tape is arranged on the outside, there is a lower likelihood of air penetration and an occurrence of a defect compared to a case where a prepreg sheet is wound, when a prepreg tape, being with small-width, is wound.

In addition, as described above, with respect to winding performed in a state where adjacent ends in the small-width direction abut closely each other, since the prepreg tape is wound on a prepreg sheet already wound around a mandrel, the need to exercise caution when performing an operation of winding in a state where adjacent ends in the small-width direction abut closely each other is not so significant as in a case where the prepreg tape is directly wound around the mandrel. Therefore, a relatively favorable winding state can be achieved.

As described above, a rod body for a fishing rod can be provided which enables the rod to be handled in response to a movement of a fish and which functions sufficiently in terms of both manufacturing and strength.

With the characteristic configuration according to a second invention, the following advantageous effect can be achieved in addition to the advantageous effect described in association with the first invention. The outermost layer is formed further outside of the outer layer. The outermost layer is composed by a prepreg tape as an inner portion thereof and a prepreg sheet as an outer portion thereof, and is composed just in such a manner where the prepreg tape of the inner layer according to the first invention is used as the outer portion, the prepreg tape of the outer layer according to the first invention is used as the inner portion and then these prepreg tapes are overlapped.

As described above, with the rod body for a fishing rod according to the second invention which is provided with an outermost layer, a matching force against a torsional force can be enhanced and, particularly, the rod body for a fishing rod may be applied to a large-size fishing rod or the like for fishing big fish.

With the characteristic configuration according to a third invention, since the inner prepreg tape and the outer prepreg tape are wound so as to cross each other when viewed in the radial direction, with the winding being formed helically in directions opposite to each other, so that reinforcing fibers of the inner prepreg tape and reinforcing fibers of the outer prepreg tape cross each other when viewed in a radial direction, with the winding being formed helically in directions opposite to each other, the reinforcing fibers of some of the prepreg tapes match the torsional force, even if a torsional force is applied from either left-hand or right-hand direction. As a result, a rod body with a high strength to torsion is obtained.

In addition, since the prepreg tape is helically wound in the rod axis direction in a state where ends in the small-width direction of the prepreg tape abut closely each other, besides simply reinforcing the prepreg sheet of the inner layer, the prepreg tape also becomes an element that constitutes an independent layer of the rod body for a fishing rod and enhances strength to torsion.

Therefore, when an angler holds a fishing rod sideways to respond to a movement of a fish which has struck and which runs sideways, an operation for bringing the fish to the water surface while following the movement of the fish with the fishing rod can be easily performed. Accordingly, a rod body for a fishing rod can be provided which enables movements of a fish to be controlled with ease.

With the characteristic configuration according to a fourth invention, since the inner prepreg tape and the outer prepreg tape are wound so as to cross each other when viewed in the radial direction, with the winding being formed helically in directions opposite to each other, so that reinforcing fibers of the inner prepreg tape and reinforcing fibers of the outer prepreg tape cross each other when viewed in a radial direction, with the winding being formed helically in directions opposite to each other, the reinforcing fibers of some of the prepreg tapes match the torsional force, even if a torsional force is applied from either left-hand or right-hand directions. As a result, a rod body with a high strength to torsion is obtained.

In addition, since the prepreg tape is helically wound in the rod axis direction in a state where ends in the small-width direction of the prepreg tape abut closely each other, besides simply reinforcing the prepreg sheet of the inner layer, the prepreg tape also becomes an element that constitutes an independent layer of the rod body for a fishing rod and enhances strength to torsion.

Therefore, when an angler holds a rod sideways to respond to a movement of a fish which has struck and which runs sideways, an operation for bringing the fish to the water surface while following the movement of the fish with the fishing rod can be easily performed. Accordingly, a rod body for a fishing rod can be provided which enables movements of a fish to be controlled with ease.

Furthermore, since an intermediate layer is provided between the inner layer formed by helically winding a prepreg tape with small-width and the outer layer formed by similarly helically winding a prepreg tape with small-width and the intermediate layer is a prepreg sheet having a length corresponding to the length of the rod body, the prepreg tapes with small-width are coupled and bonded by the prepreg sheet as the intermediate layer. As a result, respective individual bonding forces of the inner layer and the outer layer are increased and, at the same time, the bonding force between the inner layer and the intermediate layer and the bonding force between the intermediate layer and the outer layer can also be enhanced. Accordingly, delamination in the inner layer and the outer layer, interlayer delamination between the inner layer and the intermediate layer and interlayer delamination between the intermediate layer and the outer layer can be restrained and a fishing rod with a lower risk of damage can be provided.

Moreover, when a fish has struck, bending which causes the tip of a fishing rod to move downward occurs in the rod bodies. In this case, a tensile force acts on a cross section on an upper side of the rod axis of the rod body. Since reinforcing fibers are uniformly aligned in the rod axis direction in the intermediate layer, a matching force against a force that bends the rod body is high. In other words, a rod body with a high bending rigidity can be provided.

With a characteristic configuration according to a fifth invention, the first inner prepreg tape and the second inner prepreg tape are wound in an inner layer so as to cross each other when viewed in the radial direction, with the winding being formed helically in directions opposite to each other, so that reinforcing fibers of the first inner prepreg tape and reinforcing fibers of the second inner prepreg tape cross each other when viewed in a radial direction, with the winding being formed helically in directions opposite to each other. Therefore, torsional rigidity can be enhanced with the inner layer alone, as described in the advantageous effect of the third invention. The same applies to the outer layer.

In addition, since prepreg tapes are respectively overlapped in inward and outward directions in the inner layer and the outer layer, even if a winding state of one of the prepreg tapes is disturbed, an influence of the disturbance in the winding state of one of the prepreg tapes can be restrained by winding the other prepreg tape without disturbance and a variation in rigidity can also be restrained.

As described above, since the inner layer and the outer layer are formed by respectively overlapping prepreg tapes each other, torsional rigidity and bending rigidity can be enhanced in comparison to a case where the inner layer and the outer layer are formed by a single prepreg tape respectively, when a rod body with large-diameter such as a next base rod or a base rod on which a strong torsional force or bending force acts is formed. Accordingly, a fishing rod with a strength befitting a rod body with large-diameter can be provided.

Furthermore, since the intermediate layer is formed by winding a prepreg sheet of a first main pattern and a prepreg sheet of a second main pattern so as to be overlapped each other, torsional rigidity and bending rigidity of the intermediate layer can be enhanced in comparison to a case where the intermediate layer is formed with a single prepreg sheet.

Directions of uniform alignment of reinforcing fibers of the prepreg sheet of the first main pattern and the prepreg sheet of the second main pattern can be arbitrarily selected and combined. Therefore, combinatorial methods can be adopted such as setting the direction of uniform alignment of the reinforcing fibers to be a direction tilted relative to the rod axis when it is desired to enhance torsional rigidity, setting the direction of uniform alignment of the reinforcing fibers to be the direction of the rod axis when it is desired to enhance bending rigidity and setting the direction of uniform alignment of the reinforcing fibers of one of the prepreg sheets to be a direction tilted relative to the rod axis as well as setting the direction of uniform alignment of the reinforcing fibers of the other prepreg sheet to be the direction of the rod axis when it is desired to satisfy both torsional rigidity and bending rigidity.

With a characteristic configuration according to a sixth invention, by appropriately combining rod bodies with high torsional rigidity and bending rigidity as described above, as a whole, even a lateral run of a fish or the like can be endured by the rod to suppress movement of the fish and to bring the fish to the water surface in an easy manner.

In addition, a fishing rod can be provided which is capable of further deforming to follow the movement of the fish even when the fish strikes to cause a significant bending of the fishing rod and then dives further downward from this state, and which is also strong enough to return to a vertical straight posture by the fishing rod's own elastic restoring force when the fishing rod is swung up to a vertical posture in order to take up the fish.

DETAILED DESCRIPTION OF THE EMBODIMENTS

First Embodiment

Embodiment Corresponding to First Invention

Figure 1:
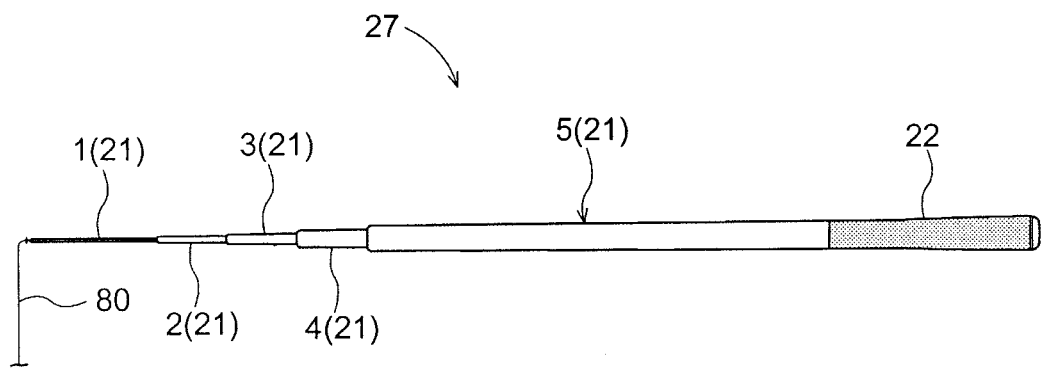
FIG. 1 is an overall side view of a fishing rod.

As shown in FIG. 1, a fishing rod 27, as typified by an ayu (sweetfish; altivelis) rod, a fishing rod for mountain stream or the like, comprises rod bodies 21 for a fishing rod including a tip rod 1 to which a fishing line 80 is coupled, a second rod 2, a third rod 3, a next base rod 4 and a base rod 5 including a grip 22.

An embodiment suitable for the rod bodies 21 for a fishing rod with relatively small diameters such as the tip rod 1 to the second rod 2 will now be explained. Here, an arrangement will be explained which comprises an inner layer 23 and an outer layer 25 and in which a prepreg sheet is used for the inner layer 23 and a single prepreg tape is used to be overlapped for the outer layer 25.

Figure 14:
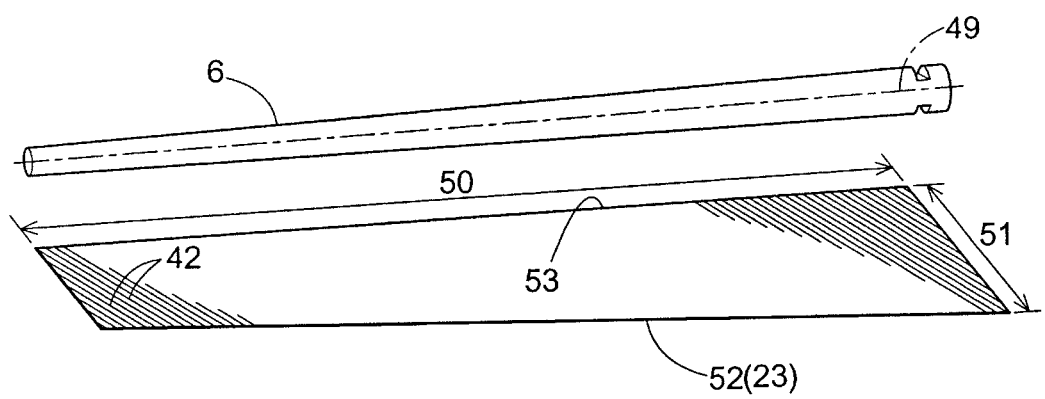
FIG. 14 is a perspective view showing a state before a prepreg sheet positioned inside is wound which represents the first half of processes according to the first and second embodiments.
Figure 15:
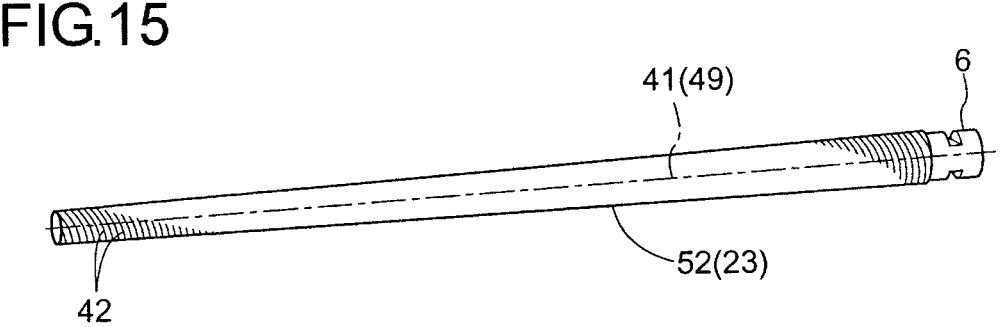
FIG. 15 is a perspective view showing a state in which a prepreg sheet is wound around a mandrel.

The inner layer 23 will now be explained. As shown in FIGS. 14 and 15, the inner layer 23 is created by winding a main pattern 52 around a mandrel 6. The main pattern 52 is produced by cutting a prepreg sheet, in which reinforcing fibers 42 are uniformly aligned in a tilted state relative to the rod axis 41 and impregnated with thermosetting resin, to be an approximately trapezoidal shape having a length 50 corresponding to the length of the rod body 21 for a fishing rod and a width 51 corresponding to the circumferential length (several circumferential lengths) of the mandrel 6. The inner layer 23 is formed by winding the main pattern 52 cut in this manner in a state in which the side surface 53 of the main pattern 52 mating with the mandrel 6 is parallel to the axis 49 of the mandrel 6.

The reinforcing fibers 42 are tilted relative to the rod axis 41 by an angle of 10° to 80° and desirably by an angle of 30° to 60°.

Figure 16:
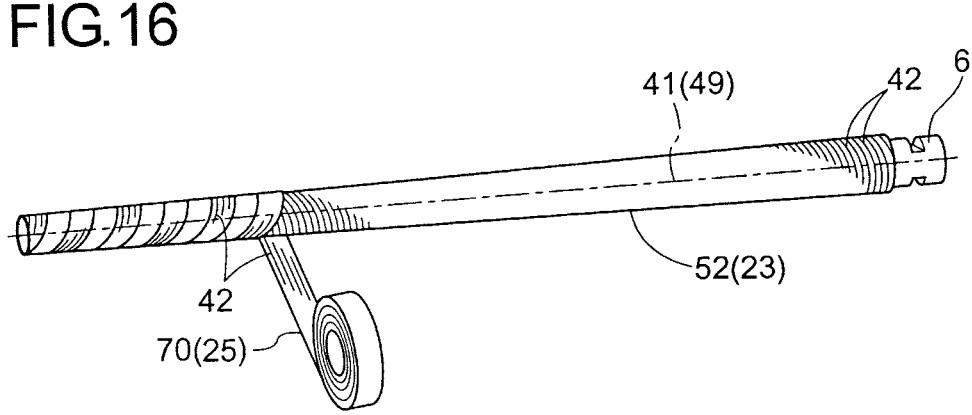
FIG. 16 is a perspective view showing a state in which a prepreg tape is wound on the prepreg sheet in the left-handed direction.

The outer layer 25 will now be explained. As shown in FIG. 16, a prepreg tape with small-width 70 is formed by impregnating reinforcing fibers 42 such as carbon fibers uniformly aligned in the longitudinal direction with a thermosetting resin such as an epoxy resin as a matrix resin. The prepreg tape 70 is helically wound in the direction of the rod axis 41 on the inner layer 23. The helical winding is performed in a closely abutting state in which adjacent ends of the prepreg tape 70 in the small-width direction contact with each other. In this manner, the outer layer 25 is formed by helically winding the prepreg tape 70.

As shown in FIG. 16, the reinforcing fibers 42 of the prepreg sheet 52 of the inner layer 23 and the reinforcing fibers 42 of the prepreg tape 70 of the outer layer 25 are wound so as to cross each other when viewed in a radial direction with the winding being formed helically in directions opposite to each other.

The crossing angle should be between 10 degrees and 75 degrees and desirably between 20 degrees and 60 degrees. In this, a basic principle is that the reinforcing fibers 42 of the prepreg tape 70 are arranged symmetrically with the reinforcing fibers 42 of the prepreg sheet 52 regarding to the rod axis 41.

In this manner, by winding the prepreg sheet 52 of the inner layer 23 and the prepreg tape 70 of the outer layer 25 so that respective reinforcing fibers 42 thereof cross each other when viewed in a radial direction and are wound in directions opposite to each other, a function of high torsional rigidity can be secured as described earlier in the section of the advantageous effects corresponding to the first invention.

Besides carbon fibers, glass fibers, boron fibers or the like can be used as the reinforcing fibers 42 and a phenolic resin or the like can be used as the thermosetting resin. A thermoplastic resin can also be used as the impregnated resin. In addition, for the reinforcing fibers 42 of the prepreg, carbon fibers with a tensile elastic modulus of 20 to 60 tons/mm$^2$ are used for a main pattern.

A decorative layer (not shown) is formed on an outer circumferential surface of the outer layer 25. The decorative layer is formed by applying a resin coating by brush painting or spray coating or by applying a thin film of a decorative raw material by physical deposition or chemical deposition.

Another Embodiment of First Embodiment (1) While the reinforcing fibers 42 of the prepreg sheet 52 as the inner layer 23 is wound in the right-handed direction, the reinforcing fibers 42 may be wound in the left-handed direction. Then, the reinforcing fibers 42 of the prepreg tape 70 as the outer layer 25 is wound in the right-handed direction.

(2) A prepreg sheet in which reinforcing fibers 42 are uniformly aligned in the rod axis direction may be arranged as an intermediate layer between the inner layer 23 and the outer layer 25. As described above, by arranging a prepreg sheet in which reinforcing fibers 42 are uniformly aligned in the rod axis direction, a matching force against a tensile force that acts on the portion on the upper side of the rod axis 41 in each rod 21 for a fishing rod can be enhanced when a fish has struck and the fishing rod 27 has bent downward.

An explanation will now be given on a result of a torsional strength test performed using the rod body 21 for a fishing rod created as described above.

The rod bodies 21 for a fishing rod used in the strength test are a product according to the present invention and a conventional product described in the section of Background of the Invention. The product according to the present invention is the rod body 21 for a fishing rod described in the first embodiment. On the other hand, as the conventional product, a rod body for a fishing rod is used in which prepreg tapes are used for both the inner layer 23 and the outer layer 25 and the reinforcing fibers 42 of the prepreg tapes are wound so as to be tilted relative to the rod axis 41 and in the same direction when viewed in a radial direction.

Figure 19:
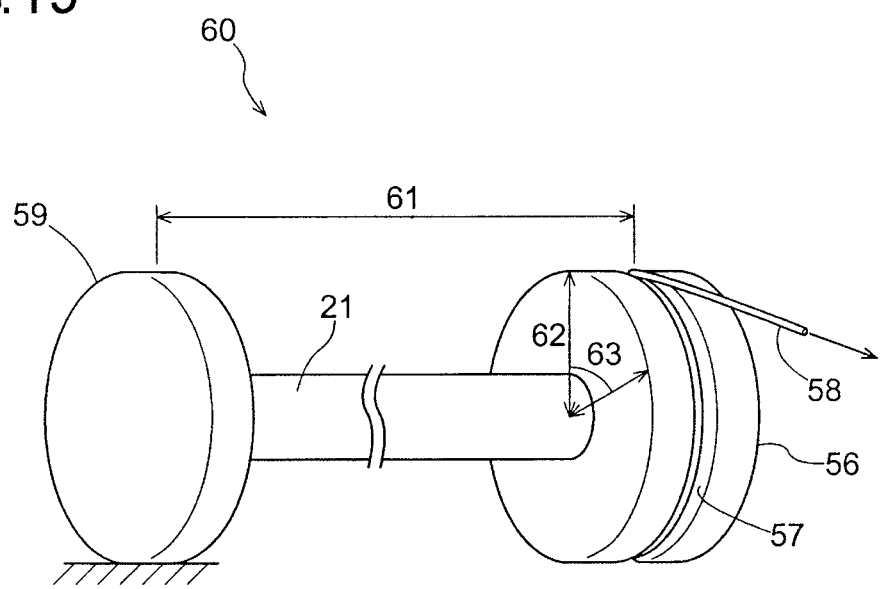
FIG. 19 is a perspective view showing a measuring apparatus that measures a torsional force of a rod body.

The strength test was performed using a measuring apparatus 60 configured as described below. As shown in FIG. 19, the rod body 21 for a fishing rod is sandwiched between and supported by a fixed disk 59 and a rotating disk 56 which are arranged to the left and right of a rod body 21 for a fishing rod and which are separated from each other by a spacing S (denoted by reference numeral 61 in the drawing). An annular groove 57 is formed on the outer circumferential surface of the rotating disk 56, a measurement wire 58 is mounted on the annular groove 57, one end of the measurement wire 58 is fixed to the rotating disk 56, and the other end of the measurement wire 58 is to be drawn out along with rotation of the rotating disk 56.

Torsional rigidity of the product according to the present invention and the conventional product is evaluated by an extracted amount (amount of torsion) and an extracting force (torsional force) of the measurement wire 58.

Strengths related to a torsional rigidity $GI_p$ includes a specific torsion angle θ/S which may be expressed by the following expression.

A specific torsion angle may be expressed as $$(θ/S)=(360 \text{ degrees}/2Π)×(T/I_pG) \tag{A}$$

where T denotes a torsional moment, $I_p$ denotes a polar cross section area moment of inertia, G denotes a modulus of transverse elasticity, θ denotes a torsional angle (reference numeral 63 in drawing) and S denotes a spacing between the fixed disk 59 and the rotating disk 56 (reference numeral 61 in drawing).

The torsional moment T may be expressed as $$T=P×R \tag{B}$$

where P denotes a torsional force (tensile force) and R denotes the radius of the rotating disk (reference numeral 62 in drawing).

An amount of torsion H may be expressed as $$H≈R×θ \tag{C}$$

where H denotes an amount of torsion.

Expressions (B) and (C) are substituted into the expression (A) above to calculate an expression of torsional rigidity $GI_p$.

$$GI_p \approx (2\Pi/360 \text{ degrees}) \times (SR^2) \times (P/H) \approx (\text{constant}) \times (P/H)$$

Thus, torsional rigidity $GI_p$ may be expressed as an inclination in a relational equation between the torsional force P and the amount of torsion H described above.

In addition, based on the expression provided above, an extracted length (amount of torsion H) of the measurement wire 58 as the rotating disk 56 rotates when a torsional force P is applied was measured to indirectly evaluate the torsional rigidity $GI_p$.

Numerical values of the measuring apparatus 60 used are such that S=340 mm and R=150 mm.

Figure 20:
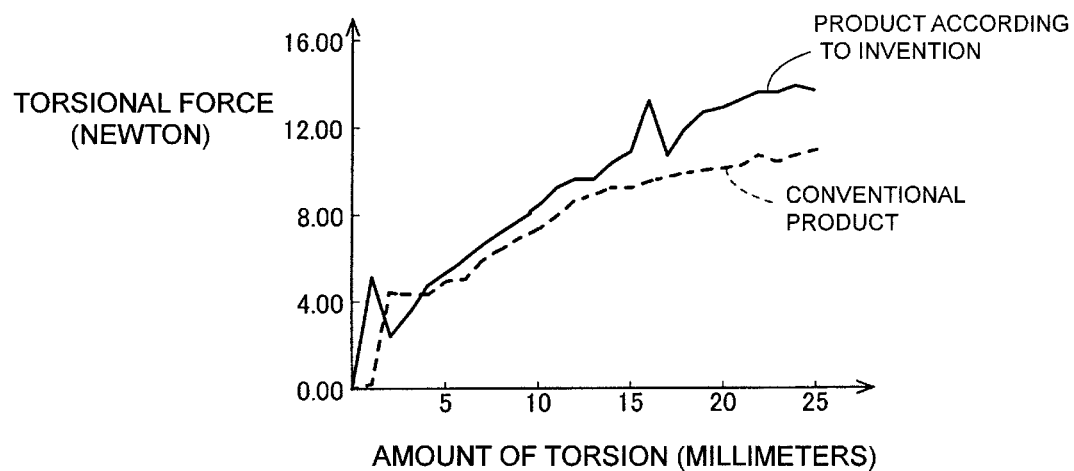
FIG. 20 is a line graph showing numerical values of a state of right-handed torsion as measured by an apparatus that measures a torsional force in a rod body.

FIG. 20 shows test results of the product according to the present invention and the conventional product when torsion in right-handed direction is applied. In this case, the product according to the present invention presents slightly favorable numerical values as compared to the conventional product and, when the numerical value of the torsional force exceeds 12 N (Newton), a torsional state is exhibited in which the measurement wire 58 is extracted by approximately 25 mm.

Therefore, when the winding direction of the reinforcing fibers 42 of the conventional product is the same as the direction of torsion, it may be argued that a difference in torsional rigidity between the product according to the present invention and the conventional product is small.

Figure 21:
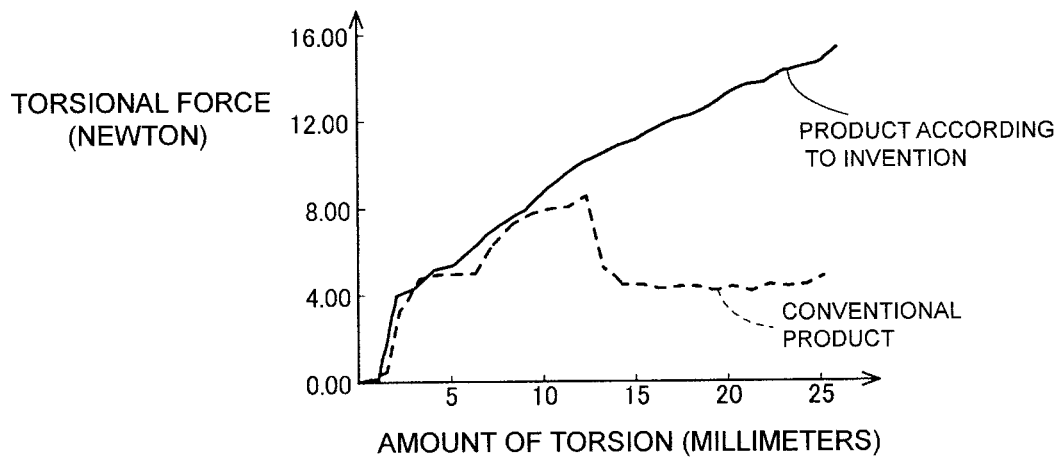
FIG. 21 is a line graph showing numerical values of a state of left-handed torsion as measured by an apparatus that measures a torsional force in a rod body.

As shown in FIG. 21, when torsion in the opposite direction (torsion in left-handed direction) is applied, circumstances differ between the product according to the present invention and the conventional product. That is, with the product according to the present invention, a torsional state is exhibited in which the measurement wire 58 is extracted by approximately 25 mm when torsional force approaches 14 N, in the same manner as the case of right-handed torsion.

However, in the case of the conventional product, a torsional state in which the measurement wire 58 is extracted by approximately 25 mm is exhibited even when the torsional force is under 8 N, which represents a low torsional rigidity. In other words, it is shown that with a conventional product, torsional rigidity decreases dramatically when a torsional force acts in the opposite direction.

As described above, when the winding direction of the reinforcing fibers 42 is opposite to the torsional direction, torsional rigidity of the conventional product decreases dramatically as shown in FIG. 21. In comparison, since the product according to the present invention comprises both reinforcing fibers 42 with a winding direction capable of responding to torsion in left-handed direction and reinforcing fibers 42 with a winding direction capable of responding to torsion in right-handed direction, torsional rigidity hardly differs depending on torsional direction as was the case with the conventional product.

In addition, while the easiness of bringing a fish running sideways to the water surface has been described in the section of the advantageous effects, a field test was performed on the easiness of bringing a fish to the water surface. For the field test, two types of fishing rods 27 were respectively prepared as conventional products and as products according to the present invention. Two field testers performed the test. The two types of fishing rods 27 include a still fishing rod 27 for performing still fishing which has a fishing rig that is only half of the length of the fishing rod 27 and a long-rig fishing rod 27 which has a fishing rig that is longer than the length of the fishing rod 27.

In the field test, two field testers 73 and 74 landed 12 fish using respective fishing rods 27, weights of the landed fish and times required to bring the fish to the water surface were measured, then each time was divided by weight, maximum and minimum values were discarded and the remaining numerical values were averaged. Thus, an evaluation of what kind of fishing rod 27 is capable of bringing a fish to the water surface in an easy manner depending on a winding state of the reinforcing fibers 42 of the fishing rod 27 was performed.

Figure 22:
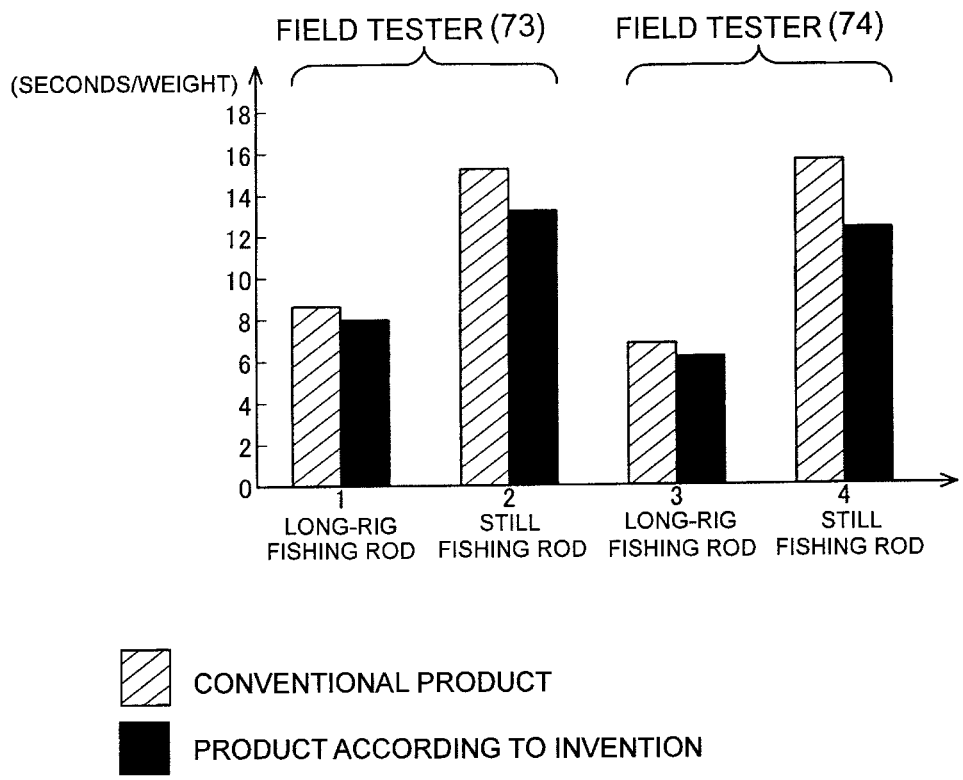
FIG. 22 is a bar graph showing a result of a field test for evaluating how easily a fish is brought to water surface.

A result of the evaluation is shown in FIG. 22. According to the result, while a difference is induced in bringing a fish to the water surface due to a difference in the length of fishing rigs between the still fishing rod 27 and the long-rig fishing rod 27, it may be said that, generally, it is easier to bring a fish to the water surface using the product according to the present invention.

Second Embodiment

Embodiment Corresponding to Second Invention

A manufacturing process of a rod body 21 for a fishing rod corresponding to the second invention will be explained. An embodiment suitable for the rod bodies 21 for a fishing rod with relatively large diameters from the third rod 3 to the base rod 5 or the like and for fishing even larger fish will now be explained. Here, a process will be explained for creating a rod body 21 for a fishing rod that is distinct from the rod body 21 for a fishing rod according to the first embodiment in which the outermost layer 81 described below is wound around the rod body 21 for a fishing rod before forming the decorative layer in the first embodiment. In other words, a new rod body 21 for a fishing rod is formed by further forming the outermost layer 81 on the outer layer 25 of the rod body 21 for a fishing rod according to the first embodiment.

The outermost layer 81 is formed by winding an outer prepreg tape 71 that forms an inner portion and an outer main pattern 72 that forms an outer portion so as to form a rod body 21 for a fishing rod that is distinct from the rod body 21 for a fishing rod presented in the first embodiment.

Figure 17:
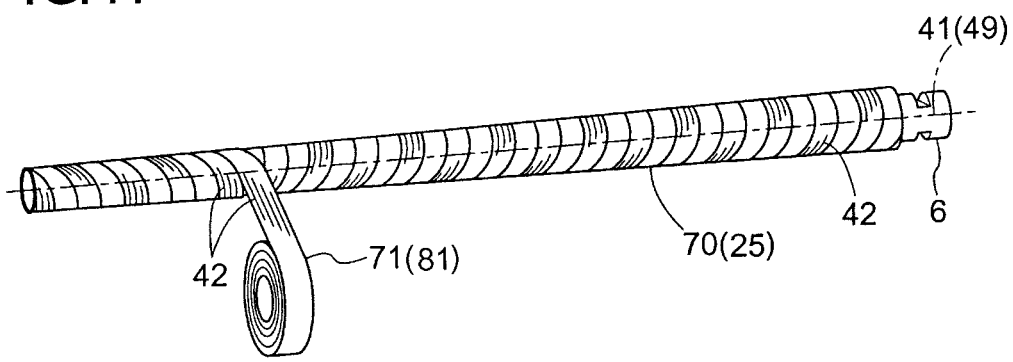
FIG. 17 is a perspective view showing a state in which an outer prepreg tape is wound on a prepreg tape which represents the second half of processes according to the second embodiment.

As shown in FIG. 17, the outer prepreg tape 71 as an inner portion of the outermost layer 81 is formed as a tape with small-width by impregnating reinforcing fibers 42 such as carbon fibers uniformly aligned in the longitudinal direction with a thermosetting resin such as an epoxy resin as a matrix resin. The outer prepreg tape 71 is helically round in the rod axis direction on the prepreg tape 70 as the outer layer 25. The helical winding is performed in a closely abutting state in which adjacent ends of the outer prepreg tape 71 in the small-width direction contact with each other. In this manner, by helically winding the outer prepreg tape 71 in a right-handed direction, a high matching force against torsional force is provided, since reinforcing fibers 42 of the prepreg tape 70 positioned on the inside and reinforcing fibers 42 of the outer prepreg tape 71 are wound so as to cross each other when viewed in a radial direction and are wound in directions opposite to each other.

In this, a basic principle is that the reinforcing fibers 42 of the outer prepreg tape 71 are arranged symmetrically with the reinforcing fibers 42 of the prepreg tape 70 regarding to the rod axis 41.

Figure 18:
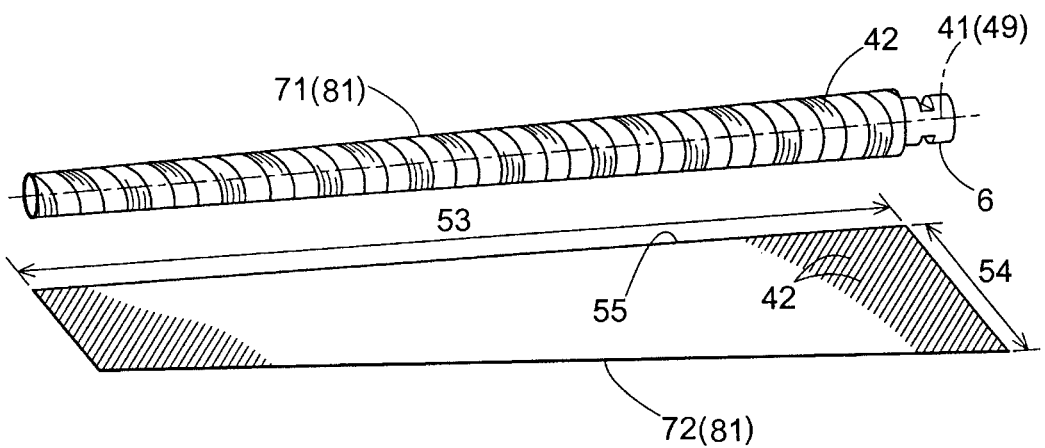
FIG. 18 is a perspective view showing a state before an outer prepreg sheet is wound on the outer prepreg tape.

As shown in FIG. 18, the outer main pattern 72 as the outer portion of the outermost layer 81 is wound on the outside of the outer prepreg tape 71 as the inner portion of the outermost layer 81. The outer main pattern 72 is produced by cutting an outer prepreg sheet, in which reinforcing fibers 42 are uniformly aligned in a tilted state relative to the rod axis 41 and impregnated with thermosetting resin, to be an approximately trapezoidal shape having a length 53 corresponding to the length of the rod body 21 for a fishing rod and a width 54 corresponding to the circumferential length (several circumferential lengths) of a mandrel 6. The outermost layer 81 is formed by winding the outer main pattern 72 cut in this manner in a state in which the side 55 of the outer main pattern 72 mating with the mandrel 6 takes a posture that is parallel to the axis 49 of the mandrel 6.

The reinforcing fibers 42 are tilted relative to the rod axis 41 by an angle of 10° to 80° and desirably by an angle of 30° to 60°.

As shown in FIG. 18, the reinforcing fibers 42 of the outer prepreg tape 71 and the reinforcing fibers 42 of the outer main pattern 72 are wound so as to cross each other when viewed in a radial direction and are wound in directions opposite to each other. The crossing angle should be between 10 degrees and 75 degrees and desirably between 20 degrees and 60 degrees. In this, a basic principle is that the reinforcing fibers 42 of the outer main pattern 72 are arranged symmetrically with the reinforcing fibers 42 of the outer prepreg tape 71 regarding to the rod axis 41.

As described above, while two prepreg tapes 70 and 71 and two prepreg sheets 52 and 72 are wound so as to be overlapped each other, the winding directions of the respective reinforcing fibers 42 are set to be opposite to each other.

In addition, the crossing angle should be between 10 degrees and 75 degrees and desirably between 20 degrees and 60 degrees. This is to ensure strength to torsional moment.

Combinations of winding directions of the reinforcing fibers 42 of the two prepreg tapes 70 and 71 and the two prepreg sheets 52 and 72 will now be described. These combinations can be freely selected in order to obtain a desired rigidity of the rod body 21 for a fishing rod.

States in which the reinforcing fibers 42 are helically wound along the rod axis 41 are expressed as follows. The winding directions shown in FIGS. 14 to 18 may be expressed as follows.

(1) The reinforcing fibers 42 of the prepreg sheet 52 are wound in the "right-handed direction", the reinforcing fibers 42 of the prepreg tape 70 are wound in the "left-handed direction", the reinforcing fibers 42 of the outer prepreg tape 71 are wound in the "right-handed direction" and the outer prepreg sheet 72 is wound in the "left-handed direction".

Besides the above, the following combinations of winding directions can be adopted.

(2) The prepreg sheet 52 may be wound in the "left-handed direction", the prepreg tape 70 may be wound in the "right-handed direction", the outer prepreg tape 71 may be wound in the "right-handed direction" and the outer prepreg sheet 72 may be wound in the "left-handed direction".

(3) The prepreg sheet 52 may be wound in the "right-handed direction", the prepreg tape 70 may be wound in the "left-handed direction", the outer prepreg tape 71 may be wound in the "left-handed direction" and the outer prepreg sheet 72 may be wound in the "right-handed direction".

(4) The prepreg sheet 52 may be wound in the "left-handed direction", the prepreg tape 70 may be wound in the "right-handed direction", the outer prepreg tape 71 may be wound in the "left-handed direction" and the outer prepreg sheet 72 may be wound in the "right-handed direction".

(5) As for the winding directions of the prepreg sheet 52, the prepreg tape 70, the outer prepreg tape 71 and the outer prepreg sheet 72 such as described above, arrangements necessary for degrees of torsional rigidity or bending rigidity of a rod body 21 for a fishing rod and for rod behavior related to the torsional rigidity or the bending rigidity can be adopted as appropriate.

A decorative layer (not shown) is formed on the outside of the outer prepreg sheet 72 wound as described above to form the rod body 21 for a fishing rod.

Another Embodiment of Second Embodiment

A prepreg sheet having reinforcing fibers 42 uniformly aligned in the rod axis direction may be arranged between the prepreg tape 70 of the outer layer 25 and the outer prepreg tape 71 of the outermost layer 81 or between the outer prepreg tape 71 that is the inner portion of the outermost layer 81 and the outer prepreg sheet 72 that is the outer portion of the outermost layer 81. Plurality of such prepreg sheets may be overlapped each other.

Third Embodiment

Embodiment Corresponding to Third Invention

A manufacturing process of a rod body 21 for a fishing rod will be explained.

The third embodiment may be applied to rod bodies 21 for a fishing rod with relatively small diameters such as the tip rod 1 to the second rod 2. An arrangement, which comprises an inner layer 23 and an outer layer 25 and in which prepreg tapes are respectively used for the inner layer 23 and the outer layer 25, will now be described.

Figure 2:
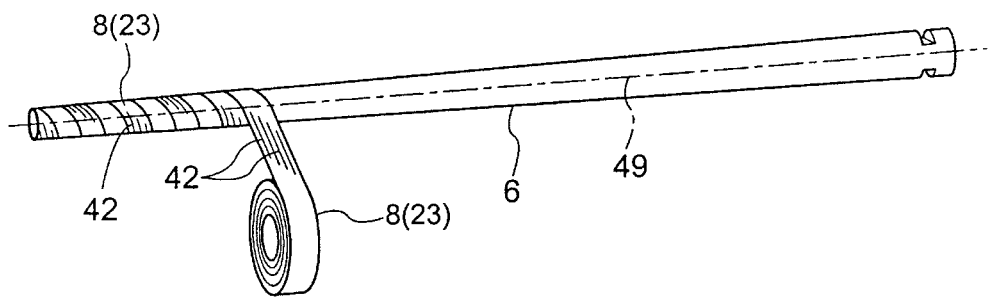
FIG. 2 is a perspective view showing a state in which an inner prepreg tape is wound in the right-handed direction according to a third embodiment.

The inner layer 23 will now be explained. As shown in FIG. 2, an inner prepreg tape with small-width 8 is formed by impregnating reinforcing fibers 42 such as carbon fibers uniformly aligned in the longitudinal direction with a thermosetting resin such as an epoxy resin as a matrix resin. The inner prepreg tape 8 is wound around a mandrel 6 in the right-handed helix along the rod axis. The helical winding is performed in a closely abutting state in which ends adjacent in the small-width direction of the inner prepreg tape 8 wound around the mandrel 6 contact with each other. In this manner, the inner layer 23 is formed by helically winding the inner prepreg tape 8.

Figure 3:
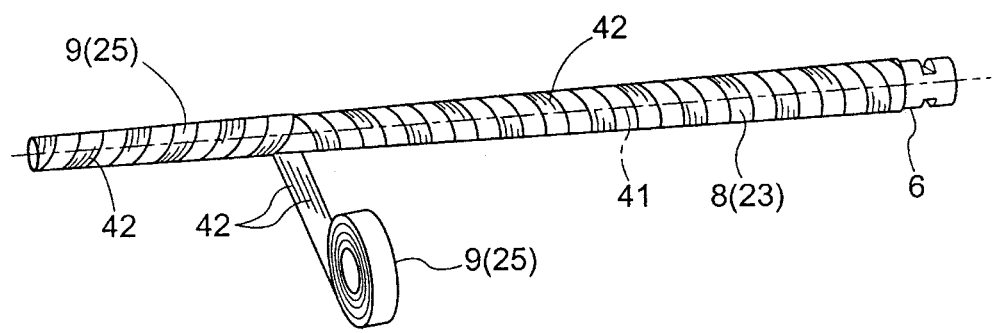
FIG. 3 is a perspective view showing a state in which the outer prepreg tape is wound in the left-handed direction on the inner prepreg tape according to the third embodiment.

The outer layer 25 will now be explained. As shown in FIG. 3, an outer prepreg tape with small-width 9 is formed by impregnating reinforcing fibers 42 such as carbon fibers uniformly aligned in the longitudinal direction with a thermosetting resin such as an epoxy resin as a matrix resin. The outer prepreg tape 9 is wound on the inner layer 23 in the left-handed helix along the rod axis. The helical winding is performed in a closely abutting state in which adjacent ends of the outer prepreg tape 9 in the small-width direction contact with each other. In this manner, the outer layer 25 is formed by helically winding the outer prepreg tape 9.

As shown in FIG. 3, the inner prepreg tape 8 of the inner layer 23 and the outer prepreg tape 9 of the outer layer 25 are wound so as to cross each other when viewed in a radial direction and are wound in directions opposite to each other. Accordingly, the reinforcing fibers 42 arranged in longitudinal directions of the respective prepreg tapes 8 and 9 are also wound so as to cross each other when viewed in a radial direction and are wound in directions opposite to each other.

The crossing angle should be between 10 degrees and 75 degrees and desirably between 20 degrees and 60 degrees.

In this manner, by arranging the inner prepreg tape 8 and the outer prepreg tape 9 so that the prepreg tapes cross each other when viewed in a radial direction and are wound in directions opposite to each other, as described in the section of the advantageous effects corresponding to the first invention, strength to torsional moment and the like can be secured.

Besides carbon fibers, glass fibers, boron fibers or the like can be used as the reinforcing fibers 42 and a phenolic resin or the like can be used as the thermosetting resin. A thermoplastic resin can also be used as the impregnated resin. In addition, as the reinforcing fibers 42 of the prepreg, carbon fibers with a tensile elastic modulus of 20 to 60 tons/mm$^2$ are used for a main pattern.

Another Embodiment of Third Embodiment

In the third embodiment, a configuration may be adopted in which before winding the inner prepreg tape 8 around the mandrel 6, a main pattern made of a prepreg sheet is wound in advance and the inner prepreg tape 8 is wound on the main pattern, although not shown. In this case, the main pattern is obtained by cutting a prepreg sheet to be a size having a length corresponding to the length of the rod body 21 for a fishing rod and a width corresponding to the circumferential length (several circumferential lengths) of the mandrel 6.

Fourth Embodiment

Embodiment Corresponding to Fourth Invention

A manufacturing process of a rod body 21 for a fishing rod will be explained. An embodiment suitable for the rod bodies 21 for a fishing rod with relatively large diameters such as the third rod 3 to the base rod 5 will now be explained. Here, an arrangement will be explained which comprises an inner layer 23, an intermediate layer 24 and an outer layer 25 and in which prepreg tapes are respectively used for the inner layer 23 and the outer layer 25 and a prepreg sheet is used for the intermediate layer 24.

Figure 4:
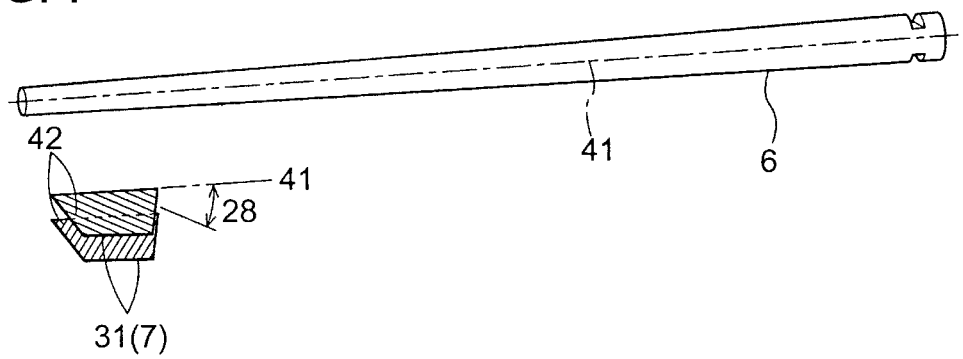
FIG. 4 is a perspective view showing a state before a first winding start reinforcing pattern is wound according to a fourth embodiment.

As shown in FIG. 4, a first winding start reinforcing pattern 7 is applied to a mandrel 6. The first winding start reinforcing pattern 7 is a biased polymer in which an upper prepreg 31 formed by impregnating reinforcing fibers 42 such as carbon fibers uniformly aligned to be tilted by a first tilt angle 28 relative to the rod axis 41 with a thermosetting resin such as an epoxy resin as a matrix resin and a lower prepreg 31 formed by arranging the direction of uniform alignment of reinforcing fibers 42 so as to be symmetrical with the reinforcing fibers 42 of the upper prepreg 31 regarding to the rod axis 41 are overlapped with each other.

Figure 5:
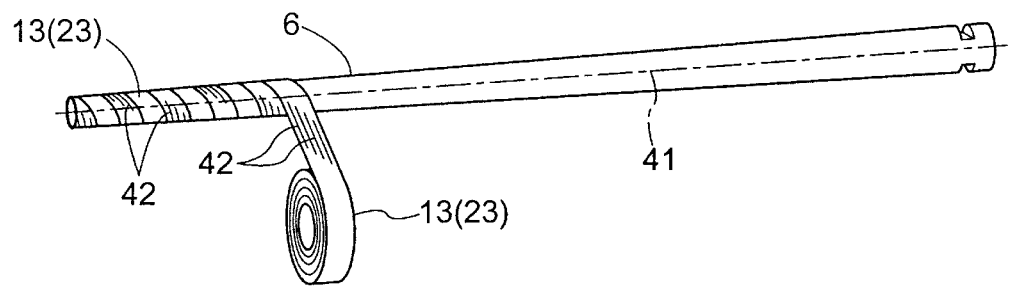
FIG. 5 is a perspective view showing a state in which an inner prepreg tape is wound in the right-handed direction according to the fourth embodiment.

The inner layer 23 will now be explained. As shown in FIG. 5, an inner prepreg tape with small-width 13 is formed by impregnating reinforcing fibers 42 such as carbon fibers uniformly aligned in the longitudinal direction with a thermosetting resin such as an epoxy resin as a matrix resin. The inner prepreg tape 13 is wound around a mandrel 6, to which the first winding start reinforcing pattern 7 has been applied, in the right-handed helix along the rod axis. The helical winding is performed in a closely abutting state in which ends adjacent in the small-width direction of the inner prepreg tape 13 wound around the mandrel 6 contact with each other. In this manner, the inner layer 23 is formed by helically winding the inner prepreg tape 13.

Figure 6:
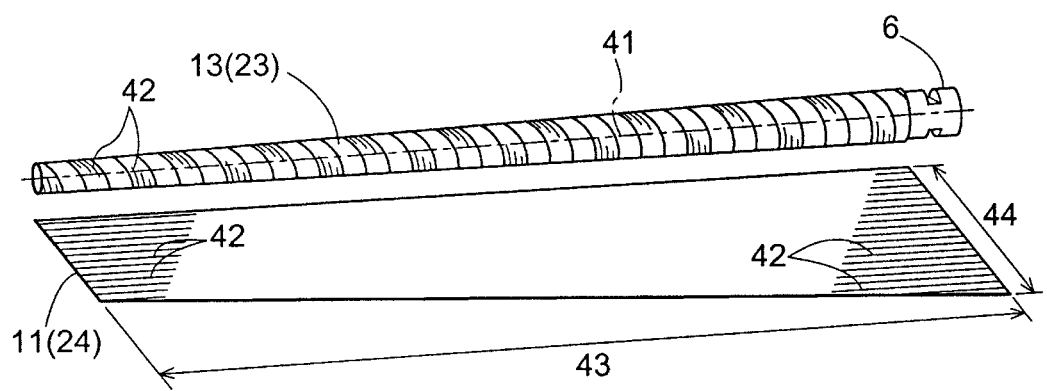
FIG. 6 is a perspective view showing a state before a prepreg sheet (main pattern) is wound according to the fourth embodiment.

The intermediate layer 24 will now be explained. As shown in FIG. 6, the main pattern 11 is produced by cutting a prepreg sheet, in which reinforcing fibers 42 are uniformly aligned along the rod axis 41 and impregnated with thermosetting resin, to be a predetermined shape having a length 43 corresponding to the length of the rod body 21 for a fishing rod and a width 44 corresponding to the circumferential length (several circumferential lengths) of the mandrel 6. The intermediate layer 24 is formed by winding the main pattern 11 around the mandrel 6.

Figure 7:
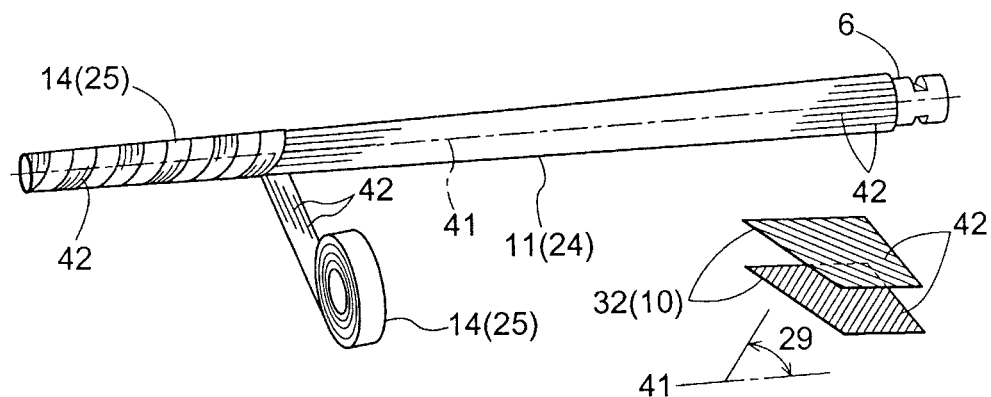
FIG. 7 is a perspective view showing a state in which an outer prepreg tape is wound in the left-handed direction according to the fourth embodiment.

The outer layer 25 will now be explained. As shown in FIG. 7, an outer prepreg tape with small-width 14 is formed by impregnating reinforcing fibers 42 such as carbon fibers uniformly aligned in the longitudinal direction with a thermosetting resin such as an epoxy resin as a matrix resin. The outer prepreg tape 14 is wound on the intermediate layer 24 in the left-handed helix along the rod axis. The helical winding is performed in a closely abutting state in which ends adjacent in the small-width direction of the outer prepreg tape 14 wound around the intermediate layer 24 contact with each other. In this manner, the outer layer 25 is formed by helically winding the outer prepreg tape 14.

The inner prepreg tape 13 of the inner layer 23 and the outer prepreg tape 14 of the outer layer 25 are wound so as to cross each other when viewed in a radial direction and are wound in directions opposite to each other, and the reinforcing fibers 42 arranged in longitudinal directions of the respective prepreg tapes 13 and 14 are also wound so as to cross each other when viewed in a radial direction and are wound in directions opposite to each other.

The crossing angle should be between 10 degrees and 75 degrees and desirably between 20 degrees and 60 degrees. This is to ensure strength to torsional moment.

The first rod butt reinforcing pattern 10 is wound after having wound the outer prepreg tape 14. The first rod butt reinforcing pattern 10 is a biased polymer in which an upper prepreg 32 and a lower prepreg 32 are overlapped with each other. The upper prepreg 32 is formed by impregnating reinforcing fibers 42 such as carbon fibers uniformly aligned to be tilted by a second tilt angle 29 relative to the rod axis 41 with a thermosetting resin such as epoxy. The lower prepreg 32 is formed by arranging the direction of uniform alignment of reinforcing fibers 42 so as to be symmetrical with the reinforcing fibers 42 of the upper prepreg 32 regarding to the rod axis 41.

In such a manner, by applying a biased first rod butt reinforcing pattern 10, the reinforcing fibers 42 provide a matching force against loads tilted relative to the rod axis 41 in addition to loads along the rod axis 41 and loads perpendicular to the rod axis 41, and strengthens an anti-shear force at coupled sections, when the outer circumferential surface of the rod butt-side end of the next base rod 4 is brought into pressure contact with the inner circumferential surface of the rod tip-side end of the base rod 5 and the telescopic fishing rod is held in an extended state, since the reinforcing fibers 42 are arranged symmetrically regarding to the rod axis 41.

Besides carbon fibers, glass fibers, boron fibers or the like can be used as the reinforcing fibers 42, and a phenolic resin or the like can be used as the thermosetting resin. A thermoplastic resin can also be used as the impregnated resin. In addition, as the prepreg reinforcing fibers 42, carbon fibers with a tensile elastic modulus of 20 to 60 tons/mm$^2$ are used for a main pattern and a carbon fiber with a tensile elastic modulus of 10 to 40 tons/mm$^2$ is used for a reinforcing pattern.

Another Embodiment of Fourth Embodiment

A prepreg in which reinforcing fibers 42 are uniformly aligned in the circumferential direction may be used as the main pattern 11.

Fifth Embodiment

Embodiment Corresponding to Fifth Invention

Next, a rod body 21 for a fishing rod with a relatively large diameter corresponding to the third rod 3 to the base rod 5 will now be explained. Here, an arrangement will be explained which comprises an inner layer 23, an intermediate layer 24 and an outer layer 25 and in which two prepreg tapes overlapped with each other are respectively used for the inner layer 23 and the outer layer 25 and two prepreg sheets overlapped with each other are used for the intermediate layer 24.

Figure 8:
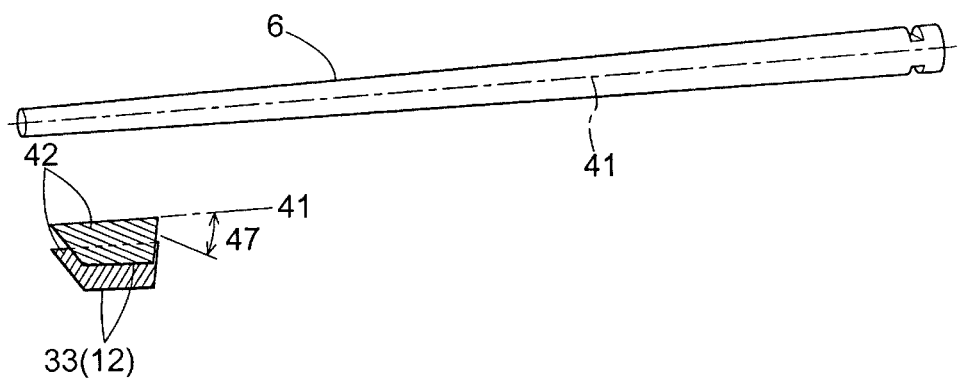
FIG. 8 is a perspective view showing a state before a second winding start reinforcing pattern is wound according to a fifth embodiment.

As shown in FIG. 8, a second winding start reinforcing pattern 12 is applied to a mandrel 6. The second winding start reinforcing pattern 12 is a biased reinforcing prepreg in which an upper prepreg 33 and a lower prepreg 33 are overlapped with each other. A direction of the reinforcing fibers 42 used in the prepregs is set to have a tilt angle 47 relative to the rod axis 41.

For the second winding start reinforcing pattern 12, the reinforcing fibers 42 constituting the prepreg, a tilt direction of the reinforcing fibers 42 relative to the rod axis 41, a matrix resin and the like may be set in the same manner as or in a manner different from the first winding start reinforcing pattern 7.

Figure 9:
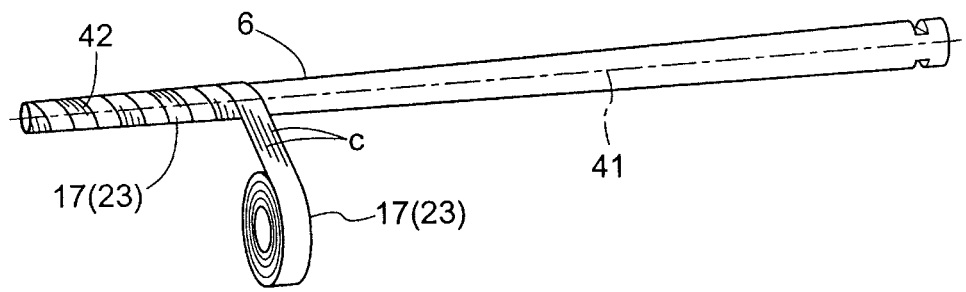
FIG. 9 is a perspective view showing a state in which a first inner prepreg tape is wound in the right-handed direction according to the fifth embodiment.

Next, the inner layer 23 is formed. As shown in FIG. 9, a first inner prepreg tape with small-width 17 is wound on the second winding start reinforcing pattern 12 in the right-handed helix along the rod axis. The helical winding is performed in a closely abutting state in which ends adjacent in the small-width direction of the wound first inner prepreg tape 17 contact with each other.

Figure 10:
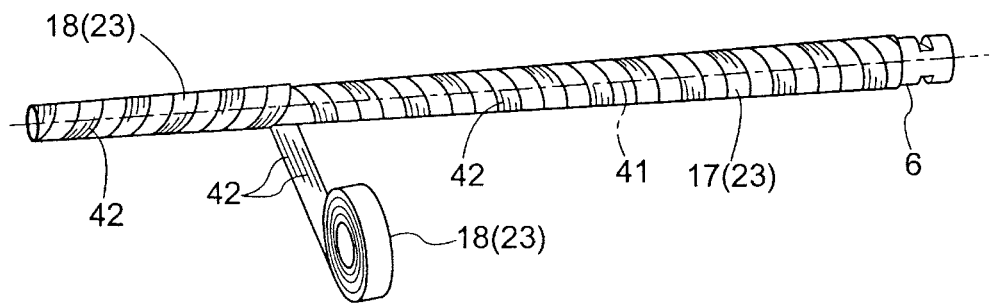
FIG. 10 is a perspective view showing a state in which a second inner prepreg tape is wound so that the second inner prepreg tape in the fifth embodiment and the first inner prepreg tape cross each other when viewed in a radial direction with the winding being formed helically in directions opposite to each other.

Subsequently, as shown in FIG. 10, a second inner prepreg tape 18 is helically wound in the rod axis direction on the first inner prepreg tape 17 wound around the mandrel 6. The helical winding is performed in a closely abutting state in which side ends of adjacent portions of the second inner prepreg tape 18 contact with each other.

While the inner layer 23 comprises the first inner prepreg tape 17 and the second inner prepreg tape 18, the winding states of the prepreg tapes 17 and 18 are as follows.

The first inner prepreg tape 17 and the second inner prepreg tape 18 are wound so as to cross each other when viewed in a radial direction and are wound in directions opposite to each other, and the reinforcing fibers 42 arranged in longitudinal directions of the respective prepreg tapes 17 and 18 are also wound so as to cross each other when viewed in a radial direction and are wound in directions opposite to each other.

The crossing angle should be between 10 degrees and 75 degrees and desirably between 20 degrees and 60 degrees. This is to ensure strength to torsional moment.

Figure 11:
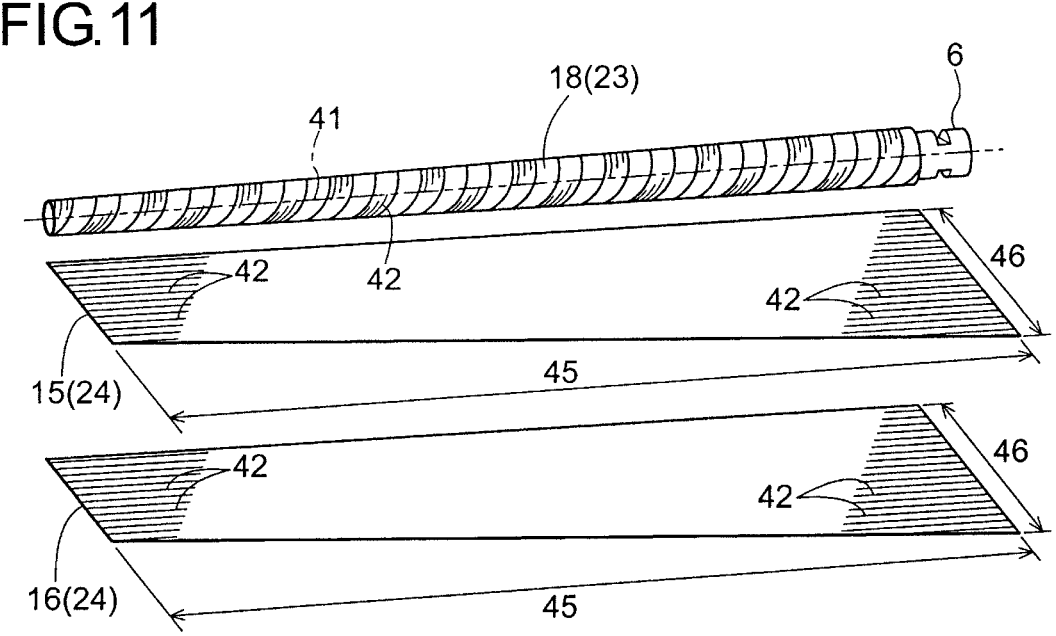
FIG. 11 is a perspective view showing a state before a prepreg sheet (first main pattern) and a prepreg sheet (second main pattern) are wound according to the fifth embodiment.

The intermediate layer 24 will now be explained. As shown in FIG. 11, the intermediate layer 24 is formed by winding a first main pattern 15 and a second main pattern 16 around a mandrel 6. The first main pattern 15 and the second main pattern 16 are produced by cutting a prepreg sheet, in which reinforcing fibers 42 are uniformly aligned along the rod axis 41 and impregnated with thermosetting resin, to be a predetermined shape having a length 45 corresponding to the length of the rod body 21 for a fishing rod and a width 46 corresponding to the circumferential length (several circumferential lengths) of the mandrel 6.

For the first main pattern 15 and the second main pattern 16, the reinforcing fibers 42 constituting the prepreg, a matrix resin, and the like may be set in the same manner as or in a manner different from the main pattern 11.

In other words, as shown in FIG. 11, the first main pattern 15 and the second main pattern 16 are arranged so that reinforcing fibers 42 of the first main pattern 15 and the second main pattern 16 are uniformly aligned in the rod axis direction.

By adopting such an arrangement, when a fish has struck and the fishing rod 27 bends significantly to cause a large tensile force to act on a portion positioned on the upper side of the rod axis 41 in a cross section of the rod body, a bending strength of the fishing rod 27 to bending can be enhanced, since the reinforcing fibers 42 provide a matching force against the tensile force.

Therefore, since the strength of the fishing rod 27 to bending can be enhanced with both prepreg sheets 15 and 16, a fishing rod 27 with high bending rigidity can be formed.

As a combination of the first main pattern 15 and the second main pattern 16, the reinforcing fibers 42 of one of the main patterns may be arranged in the direction of the rod axis 41 and the reinforcing fibers 42 of the other main pattern may be arranged in the circumferential direction.

Alternatively, both reinforcing fibers 42 may be formed in a winding state in which the reinforcing fibers 42 cross each other when viewed in the radial direction and are tilted in directions opposite to each other.

In addition, while arguments have been presented from the viewpoint of enhancing torsional rigidity, a flexibility of the rod body 21 for a fishing rod can conceivably be adjusted by appropriately selecting a tensile elastic modulus of the reinforcing fibers 42 and the number of main patterns to be overlapped with each other from a different viewpoint. In other words, to create a rod body 21 for a fishing rod with a hard feel, selecting reinforcing fibers 42 with a high tensile elastic modulus or, as shown, using the first main pattern 15 and the second main pattern 16 overlapped with each other may suffice. On the other hand, to create a rod body 21 for a fishing rod with a soft feel, a configuration may be adopted in which reinforcing fibers 42 with a low tensile elastic modulus are selected or only the first main pattern 15 is wound.

Figure 12:
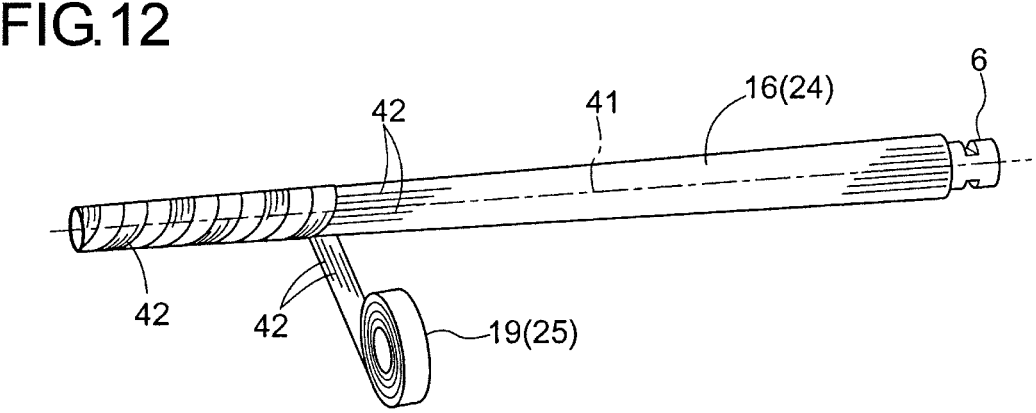
FIG. 12 is a perspective view showing a state in which a first outer prepreg tape is wound in the left-handed direction according to the fifth embodiment.

Next, the outer layer 25 is formed. As shown in FIG. 12, a first outer prepreg tape with small-width 19 is wound on the intermediate layer 24 in the left-handed helix along the rod axis. The helical winding is performed in a closely abutting state in which ends adjacent in the small-width direction of the wound first outer prepreg tape 19 contact with each other.

Figure 13:
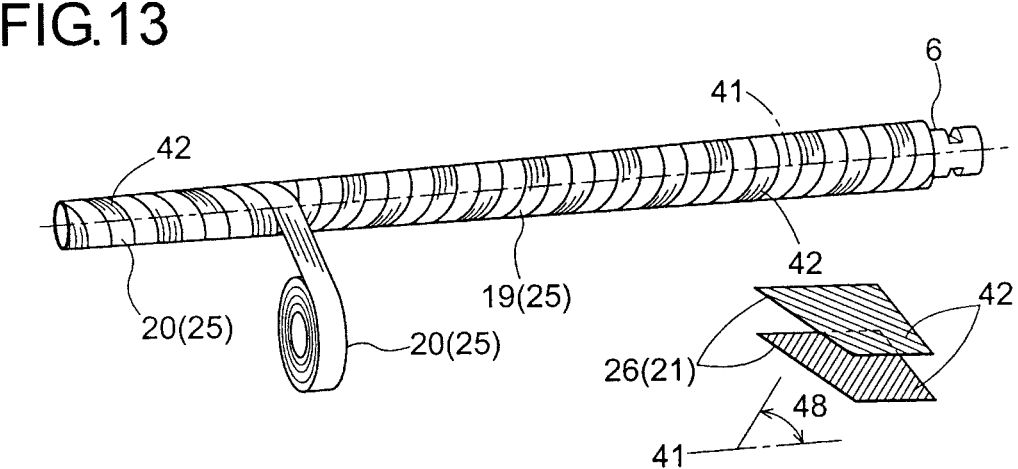
FIG. 13 is a perspective view showing a state in which a second outer prepreg tape is wound so as to cross a first outer prepreg tape according to the fifth embodiment.

Subsequently, as shown in FIG. 13, a second outer prepreg tape 20 is wound in the right-handed helix along the rod axis on the first outer prepreg tape 19 wound around the intermediate layer 24. The helical winding is performed in a closely abutting state in which adjacent ends of the second outer prepreg tape 20 in a small-width direction contact with each other.

The second rod butt reinforcing pattern 21 is wound after having wound the second outer prepreg tape 20. In other words, the second rod butt reinforcing pattern 21 is a biased polymer in which an upper prepreg 26 and a lower prepreg 26 are overlapped with each other. The upper prepreg 26 is formed by impregnating reinforcing fibers 42 such as carbon fibers uniformly aligned to be tilted by a fourth tilt angle 48 relative to the rod axis 41 with a thermosetting resin such as epoxy. The lower prepreg 26 is formed by arranging the direction of uniform alignment of reinforcing fibers 42 so as to be symmetrical with the reinforcing fibers 42 of the upper prepreg 26 regarding to the rod axis 41.

While the outer layer 25 comprises the first outer prepreg tape 19 and the second outer prepreg tape 20, the winding states of the prepreg tapes 19 and 20 are as follows.

The first outer prepreg tape 19 and the second outer prepreg tape 20 are wound so as to cross each other when viewed in a radial direction and are wound in directions opposite to each other, and the reinforcing fibers 42 arranged in the longitudinal directions of the respective prepreg tapes 19 and 20 are also wound so as to cross each other when viewed in a radial direction and are wound in directions opposite to each other.

The crossing angle should be between 10 degrees and 75 degrees and desirably between 20 degrees and 60 degrees. This is to ensure tolerance to torsional moment.

The relationships between the first inner prepreg tape 17 and the second inner prepreg tape 18 of the inner layer 23 and between the first outer prepreg tape 19 and the second outer prepreg tape 20 of the outer layer 25 will be further explained.

As described above, in the inner layer 23, the first inner prepreg tape 17 and the second inner prepreg tape 18 are wound so as to cross each other when viewed in a radial direction, and the reinforcing fibers 42 arranged in longitudinal directions of the respective prepreg tapes 17 and 18 are also wound so as to cross each other when viewed in a radial direction.

As described above, in the outer layer 25, the first outer prepreg tape 19 and the second outer prepreg tape 20 are wound so as to cross each other when viewed in a radial direction, and the reinforcing fibers 42 arranged in longitudinal directions of the respective prepreg tapes 19 and 20 are also wound so as to cross each other when viewed in a radial direction.

Combinations of the helical winding directions of the four prepreg tapes 17, 18, 19 and 20 will now be described. These combinations can be freely selected in order to obtain a desired hardness of the rod body 21 for a fishing rod.

States in which the prepreg tapes 17, 18, 19 and 20 are helically wound along the rod axis 41 are expressed as follows.

The winding directions shown in FIGS. 9 to 10 may be expressed as follows.

(1) The first inner prepreg tape 17 is wound in the "right-handed direction", the second inner prepreg tape 18 is wound in the "left-handed direction", the first outer prepreg tape 19 is wound in the "left-handed direction" and the second outer prepreg tape 20 is wound in the "right-handed direction".

In addition to the above, the following combinations of winding directions can be adopted.

(2) The first inner prepreg tape 17 may be wound in the "right-handed direction", the second inner prepreg tape 18 may be wound in the "left-handed direction", the first outer prepreg tape 19 may be wound in the "right-handed direction" and the second outer prepreg tape 20 may be wound in the "left-handed direction".

(3) The first inner prepreg tape 17 may be wound in the "left-handed direction", the second inner prepreg tape 18 may be wound in the "right-handed direction", the first outer prepreg tape 19 may be wound in the "left-handed direction" and the second outer prepreg tape 20 may be wound in the "right-handed direction".

(4) The first inner prepreg tape 17 may be wound in the "left-handed direction", the second inner prepreg tape 18 may be wound in the "right-handed direction", the first outer prepreg tape 19 may be wound in the "right-handed direction" and the second outer prepreg tape 20 may be wound in the "left-handed direction".

(5) As for winding directions of the prepreg tapes 17 to 20 such as described above, arrangements necessary for degrees of torsional rigidity and bending rigidity of the rod body 21 for a fishing rod and for a rod behavior related to the torsional rigidity and the bending rigidity can be adopted as appropriate.

Another Embodiment of Fifth Embodiment (1) In addition to the first winding start reinforcing pattern 7, although not shown, a rod butt reinforcing pattern may be provided at a corresponding position at the side end of a rod butt.

(2) When reinforcement of a rod tip portion and a rod butt side end is not required, both the first winding start reinforcing pattern 7 and the rod butt reinforcing pattern need not be provided.

Five embodiments have heretofore been described. A strength test of the rod body 21 for a fishing rod including the five embodiments has been performed. A result of the test will be described below. Five articles for test have been prepared.

No. 1 denotes a rod body 21 for a fishing rod in which both an inner layer 23 and an outer layer 25 comprise a main pattern constituted by a prepreg sheet in which reinforcing fibers 42 are arranged in the circumferential direction. In Tables 1 and 2 provided later, both the innermost layer and the outermost layer are denoted by the circumferential direction S. This means that the reinforcing fibers 42 are arranged in the circumferential direction, with S denoting "sheet".

No. 2 denotes a rod body 21 for a fishing rod in which an inner layer 23 comprises a main pattern constituted by a prepreg sheet in which reinforcing fibers 42 are arranged in the circumferential direction and an outer layer 25 comprises a prepreg tape in which reinforcing fibers 42 are arranged in the circumferential direction and which is helically wound in a right-handed direction (forward direction). In Tables 1 and 2 provided later, the innermost layer is denoted by a circumferential direction S and the outermost layer is denoted as right-handed T. For the innermost layer, this means that the reinforcing fibers 42 are arranged in the circumferential direction, with S denoting "sheet". In addition, for the outermost layer, a state is indicated in which the prepreg tape is wound in a right-handed direction.

No. 3 denotes a rod body 21 for a fishing rod in which both an inner layer 23 and an outer layer 25 comprise a prepreg tape in which reinforcing fibers 42 are arranged in the circumferential direction and which is helically wound in a right-handed direction (forward direction). In Tables 1 and 2 provided later, both the innermost layer and the outermost layer are denoted by the right-handed T and a state is indicated in which the prepreg tapes are wound in the right-handed direction.

No. 4 denotes a rod body 21 for a fishing rod in which an inner layer 23 comprises a prepreg tape in which reinforcing fibers 42 are arranged in the circumferential direction and which is helically wound in the left-handed direction (reverse direction) and an outer layer 25 comprises a prepreg tape in which reinforcing fibers 42 are arranged in the circumferential direction and which is helically wound in the right-handed direction (forward direction). In Tables 1 and 2 provided later, the innermost layer is denoted by the left-handed T and the outermost layer is denoted by the right-handed T. For the innermost layer a state is indicated in which the prepreg tape is wound in the left-handed direction and for the outermost layer a state is indicated in which the prepreg tape is wound in the right-handed direction.

No. 5 denotes a rod body 21 for a fishing rod in which an inner layer 23 comprises a main pattern constituted by a prepreg sheet in which reinforcing fibers 42 are arranged in a slightly tilted state relative to the circumferential direction and an outer layer 25 comprises a prepreg tape in which reinforcing fibers 42 are arranged in the circumferential direction and which is helically wound in the right-handed direction (forward direction). In Tables 1 and 2 provided later, the innermost layer is denoted by a tilt S and the outermost layer is denoted as right-handed T. For the innermost layer, this means that the prepreg sheet is arranged in which the reinforcing fibers 42 are arranged slightly tilted relative to the circumferential direction, with S denoting "sheet". In addition, for the outermost layer, a state is indicated in which the prepreg tape is wound in the right-handed direction.

A result of the test will be explained with reference to the following tables.

In Table 1, breaking strength and the like are measured in a state where a right-handed torsion is applied to the rod bodies 21 for a fishing rod.

TABLE 1

| | SHEET S OR TAPE T | | DATA OF RIGH-HANDED TORSION | | BREAKING | TORQUE × |
| NO. | INNERMOST LAYER | OUTERMOST LAYER | RIGIDITY Nm/rad | TORQUE Nm | ANGLE rad | BREAKING STRENGTH |
| --- | --- | --- | --- | --- | --- | --- |
| 1 | CIRCUMFER- ENTIAL DIRECTION S | CIRCUMFER- ENTIAL DIRECTION S | 0.16 | 0.61 | 2.75 | 1.68 |
| 2 | CIRCUMFER- ENTIAL DIRECTION S | RIGHT- HANDED T | 0.23 | 0.94 | 4.88 | 4.61 |
| 3 | RIGHT- HANDED T | RIGHT- HANDED T | 0.21 | 0.79 | 3.28 | 2.59 |
| 4 | LEFT- HANDED T | RIGHT- HANDED T | 0.33 | 1.01 | 2.70 | 2.73 |
| 5 | TILTED S | RIGHT- HANDED T | 0.30 | 1.03 | 2.93 | 3.01 |

In Table 2, breaking strength and the like are measured in a state where a left-handed torsion is applied to the rod bodies 21 for a fishing rod.

TABLE 2

| | SHEET S OR TAPE T | | DATA OF LEFT-HANDED TORSION | | BREAKING | TORQUE × |
| NO. | INNERMOST LAYER | OUTERMOST LAYER | RIGIDITY Nm/rad | TORQUE Nm | ANGLE rad | BREAKING STRENGTH |
| --- | --- | --- | --- | --- | --- | --- |
| 1 | CIRCUMFER- ENTIAL DIRECTION S | CIRCUMFER- ENTIAL DIRECTION S | 0.18 | 0.49 | 1.64 | 0.81 |
| 2 | CIRCUMFER- ENTIAL DIRECTION S | RIGHT- HANDED T | 0.22 | 0.66 | 2.04 | 1.34 |
| 3 | RIGHT- HANDED T | RIGHT- HANDED T | 0.26 | 0.62 | 1.73 | 1.06 |
| 4 | LEFT- HANDED T | RIGHT- HANDED T | 0.30 | 0.88 | 2.20 | 1.94 |
| 5 | TILTED S | RIGHT- HANDED T | 0.42 | 0.44 | 0.70 | 0.31 |

An evaluation of the measurement results presented above suggests that noteworthy data among the measurement results is a rigidity Nm/red that matches torsion. An improved product (No. 2) having the innermost layer 23 comprising a prepreg sheet in which reinforcing fibers 12 are arranged in the circumferential direction and the outermost layer 25 comprising a prepreg tape helically wound in the right-handed direction (forward direction) shows a high numerical value of 0.22 (average of left and right torsional direction values)/0.16 which is an improvement in a rigidity value of approximately 41 percent compared to a conventional product (No. 1) having the innermost layer 23 and the outermost layer 25 both comprising a prepreg sheet respectively in which reinforcing fibers 42 are arranged in the circumferential direction.

In comparison, the product according to the present invention (No. 4) shows an even higher numerical value of 0.31 (average of left and right torsional direction values)/0.22 which gives a further improvement of approximately 34 percent over the improved product (No. 2).

INDUSTRIAL APPLICABILITY

The configuration according to the resent invention is applicable to a fishing rod for surf fishing, a fishing rod for boat fishing and the like in which a fishing line guide is attached to the outer circumferential surface of a rod body, and is also applicable to a pass-through fishing rod in which a fishing line guide is built into a rod body. In addition to a telescopic fishing rod, the configuration according to the present invention is also applicable to a fishing rod with a tip-over-butt ferrule joint and a fishing rod with a spigot ferrule joint.

What is claimed is:

1. A rod body for a fishing rod having an inner layer and an outer layer, wherein
   the inner layer is formed by winding a main pattern in the right or left direction, which is constituted by a prepreg sheet having a length corresponding to the length of the rod body and provided with reinforcing fibers uniformly aligned so that the reinforcing fibers are tilted relative to the rod axis,
   the outer layer is formed by helically winding a prepreg tape with small-width, which is constituted by reinforcing fibers uniformly aligned in the longitudinal direction, in the rod axis direction so that ends of the prepreg tape in the small-width direction thereof abut closely against each other, and
   the prepreg sheet and the prepreg tape are wound so that the reinforcing fibers of the prepreg sheet and the reinforcing fibers of the prepreg tape are wound so as to cross each other when viewed in a radial direction, with the winding being made helically in directions opposite to each other.

2. A rod body for a fishing rod having an inner layer and an outer layer, wherein
   the inner layer is formed by winding a main pattern in the right or left direction, which is constituted by a prepreg sheet having a length corresponding to the length of the rod body and provided with reinforcing fibers uniformly aligned so that the reinforcing fibers are tilted relative to the rod axis,
   the outer layer is formed by helically winding a prepreg tape with small-width, which is constituted by reinforcing fibers uniformly aligned in the longitudinal direction, in the rod axis direction so that ends of the prepreg tape in the small-width direction thereof abut closely against each other, and
   the prepreg sheet and the prepreg tape are wound so that the reinforcing fibers of the prepreg sheet and the reinforcing fibers of the prepreg tape are wound so as to cross each other when viewed in a radial direction, with the winding being made helically in directions opposite to each other,
   wherein an outermost layer is provided further outside the outer layer, the outermost layer is formed by overlapping, with each other, an inner portion formed by helically winding a outer prepreg tape with small-width, which is constituted by reinforcing fibers uniformly aligned in the longitudinal direction, in the rod axis direction so that ends of the outer prepreg tape in the small-width direction thereof abut closely against each other, and an outer portion formed by winding an outer main pattern, which is constituted by an outer prepreg sheet having a length corresponding to the length of the rod body and provided with reinforcing fibers uniformly aligned so that the reinforcing fibers are tilted relative to the rod axis, and
   the outer prepreg sheet of the outermost layer and the outer prepreg tape of the outermost layer are wound so that the reinforcing fibers of the outer prepreg tape of the outermost layer and the reinforcing fibers of the outer prepreg sheet of the outermost layer are wound so as to cross each other when viewed in a radial direction, with the winding being formed helically in directions opposite to each other.

3. A rod body for a fishing rod having an inner layer and an outer layer, wherein
   the inner layer is formed by helically winding an inner prepreg tape in the right or left direction with small-width, which is constituted by carbon fibers uniformly aligned in the longitudinal direction, in the rod axis direction so that ends of the inner prepreg tape in the small-width direction thereof abut closely against each other,
   the outer layer is formed by helically winding an outer prepreg tape with small-width, which is constituted by carbon fibers uniformly aligned in the longitudinal direction, in the rod axis direction so that ends of the outer prepreg tape in the small-width direction thereof abut closely against each other, and
   the inner prepreg tape and the outer prepreg tape are wound so as to cross each other when viewed in a radial direction, with the winding being made helically in directions opposite to each other, so that the carbon fibers of the inner prepreg tape and the carbon fibers of the outer prepreg tape are wound so as to cross each other when viewed in a radial direction, with the winding being made helically in directions opposite to each other.

4. A rod body for a fishing rod having an inner layer, an intermediate layer and an outer layer, wherein
   the inner layer is formed by helically winding an inner prepreg tape in the right or left direction with small-width, which is constituted by carbon fibers uniformly aligned in the longitudinal direction, in the rod axis direction so that ends of the inner prepreg tape in the small-width direction thereof abut closely against each other,
   the intermediate layer is formed by winding a main pattern constituted by a prepreg sheet having a length corresponding to the length of the rod body and provided with carbon fibers uniformly aligned,
   the outer layer is formed by helically winding an outer prepreg tape with small-width, which is constituted by carbon fibers uniformly aligned in the longitudinal direction, in a closely abutting state in the rod axis direction so that ends of the outer prepreg tape in the small-width direction thereof abut closely against each other, and
   the inner prepreg tape and the outer prepreg tape are wound so as to cross each other when viewed in a radial direction, with the winding being made helically in directions opposite to each other so that the carbon fibers of the inner prepreg tape and the carbon fibers of the outer prepreg tape are wound so as to cross each other when viewed in a radial direction, with the winding being made helically in directions opposite to each other.

5. A rod body for a fishing rod having an inner layer, an intermediate layer and an outer layer, wherein
   the inner layer is formed by helically winding a first inner prepreg tape in the right or left direction with small-width, which is constituted by reinforcing fibers uniformly aligned in the longitudinal direction, in the rod axis direction in a closely abutting state and by helically winding a second inner prepreg tape with small-width, which is constituted by reinforcing fibers uniformly aligned in the longitudinal direction, in the rod axis direction in a closely abutting state so as to be overlapped on the first inner prepreg tape, the intermediate layer is formed by winding a first main pattern constituted by a prepreg sheet having a length corresponding to the length of the rod body and provided with reinforcing fibers uniformly aligned and by winding a second main pattern constituted by a prepreg sheet having a length corresponding to the length of the rod body and provided with reinforcing fibers uniformly aligned on the first main pattern, the outer layer is formed by helically winding a first outer prepreg tape with small-width, which is constituted by reinforcing fibers uniformly aligned in the longitudinal direction, in the rod axis direction in a closely abutting state and by helically winding a second outer prepreg tape with small-width, which is constituted by reinforcing fibers uniformly aligned in the longitudinal direction, in the rod axis direction in a closely abutting state on the outside of the first outer prepreg tape, and the first inner prepreg tape and the second inner prepreg tape are wound so that these reinforcing fibers of the prepreg tapes cross each other when viewed in a radial direction, with the winding being made in directions opposite to each other, and the first outer prepreg tape and the second outer prepreg tape are wound so that the reinforcing fibers of these prepreg tapes cross each other when viewed in the radial direction, with the winding being made in directions opposite to each other.

6. A fishing rod comprising the rod body for a fishing rod according to any one of claims 1 to 5.

* * * * *